Patented Aug. 18, 1953

2,649,470

UNITED STATES PATENT OFFICE 2,649,470

CYANOALKYL SUBSTITUTED AMINE SULFIDES

Marion W. Harman, Nitro, W. Va., assignor to Monsanto Chemical Company, St. Louis, Mo., a corporation of Delaware No Drawing. Application October 10, 1951, Serial No. 250,787

17 Claims. (Cl. 260—464)

This invention relates to new and useful compositions of matter. More particularly it relates to sulfides of secondary amines containing an alkyl group possessing a cyano substituent, which compounds may also be called cyano substituted thioamines.

It has been found in accordance with this invention that compounds of the structure

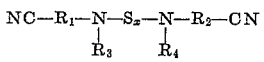

where $R_1$ and $R_2$ are like or unlike alkylene radicals, where $R_3$ and $R_4$ are like or unlike radicals selected from the group consisting of aromatic, araliphatic, aliphatic, and cycloaliphatic radicals, and where $x$ is an integer, are members of a new and useful family of chemical substances. As exemplary of $R_1$ and $R_2$ are methylene, methyl methylene, ethylene, methyl ethylene, propylene, butylene radicals and the like. As exemplary of $R_3$ and $R_4$ are methyl, ethyl, methoxy ethyl, ethoxy ethyl, propyl, isopropyl, n-butyl, sec. butyl, amyl, isoamyl, tert. amyl, hexyl, octyl, decyl, dodecyl, pentadecyl, cyclohexyl, methyl cyclohexyl, cyclohexyl substituted cyclohexyl, benzyl, hexahydrobenzyl, beta phenethyl, phenyl, chlorphenyl, methoxy phenyl, ethoxy phenyl, tolyl radicals and the like. The new compounds are soluble in most organic solvents. Many of the new amine sulfides are colored viscous liquids while others are of a crystalline or resinous nature.

The alkyl and alkyl substituted compounds may be represented by the structure $$NC-R_3-N-S_x-N-R_4-CN$$
$$\begin{array}{cc} | & | \\ R_1 & R_2 \\ | & | \\ Y_1 & Y_2 \end{array}$$

In the formula $x$ is an integer and $R_3$ and $R_4$ are like or unlike alkylene radicals as methylene, methyl methylene, ethylene, methyl ethylene, propylene and butylene. $R_1$ and $R_2$ are also like or unlike alkylene radicals and in addition may be cyclohexylidene. $Y_1$ and $Y_2$ represent hydrogen, chloro, cyano, alkoxy, aryl, cyclohexyl, methyl and amino groups. Thus where $Y_1$ and $Y_2$ are amino groups compounds have been prepared containing more than one thioamine group. Together $Y_1$, $R_1$ and $Y_2$, $R_2$ may represent such groups as methyl, methoxy ethyl, ethoxy ethyl, chlorethyl, n-propyl, sec. butyl, amyl, isoamyl, tert. amyl, hexyl, octyl, decyl, dodecyl, pentadecyl, methyl cyclohexyl, cyclohexyl substituted cyclohexyl, benzyl, hexahydrobenzyl, beta phenethyl radicals and the like.

As exemplary of the preparation of the new compounds the following are illustrative and in no manner are they to be construed as limitative of the invention.

EXAMPLE 1

To a reaction vessel equipped with a thermometer, stirrer, dropping funnel and reflux condenser, and containing a solution of 152 parts by weight (substantially 1.0 molecular proportion) of beta-cyclohexylaminopropionitrile (B. P. 109°–113° C./2 mm.) in 600 parts by weight of benzene was added slowly with constant agitation a solution of 34 parts by weight (substantially 0.25 molecular proportion) of sulfur monochloride in 50 parts by weight benzene. Through the sulfur halide addition the reaction temperature was retained at 5–10° C. Upon completion of the sulfur halide addition the reaction mix was agitated for an additional 30 minutes. Thereupon the amine hydrochloride salt was filtered off and the greater portion of the solvent contained in the filtrate evaporated over a steam bath. The residue was then heated to a liquid temperature of 110°/20 mm. to remove the residual solvent. A substantially theoretical yield of a yellow syrupy liquid believed to be N,N'-dithio-bis-beta-cyclohexylaminopropionitrile,

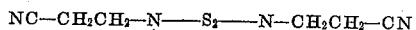
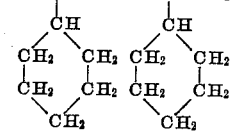

was obtained. Analysis gave 17.8% sulfur and 15.1% nitrogen, as compared to 17.5% theoretical sulfur and 15.3% theoretical nitrogen. The new disulfide was found to be soluble in most common organic solvents but insoluble in water.

The new disulfide readily took up additional sulfur upon heating therewith to form higher polysulfides. For example, upon heating substantially 0.5 molecular proportions of the above described N,N'-dithio-bis-beta-cyclohexylaminopropionitrile with substantially 1.0 molecular proportion of free sulfur at 110–130° C. there was obtained a mixture of polysulfides which was believed to consist principally of the tetrasulfide of beta-cyclohexylaminopropionitrile.

EXAMPLE 2

To a reaction vessel equipped with a thermometer, stirrer, dropping funnel, and reflux condenser and containing a solution of 129 parts by weight (substantially 1.0 molecular proportion) of beta-n-butylaminopropionitirile in 600 parts by weight benzene was added slowly with constant agitation a solution of 34 parts by weight (substantially 0.25 molecular proportion) of sulfur monochloride in 50 parts by weight benzene. Throughout the sulfur halide addition the reaction temperature was retained at 5–12° C. Upon completion of the sulfur monochloride addition agitation was continued for about one-half hour. Thereupon the amine hydrochloride salt was filtered off and the filtrate evaporated to dryness. There was obtained approximately a 98% yield of a dark amber liquid believed to be N,N'-dithio-bis-beta-n-butylaminopropionitrile,

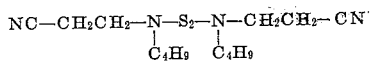

which was soluble in most organic solvents but insoluble in water. The sulfur calculated for $C_{14}H_{26}N_4S_2$ was 20.38%, found 20.3%. The calculated nitrogen value was 17.83%, found 17.9%.

A product believed to be N,N'-thio-bis-beta-n-butylaminopropionitrile,

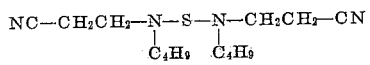

was prepared in a similar manner by reacting substantially four molecular proportions of beta-n-butylaminopropionitrile with substantially one molecular proportion of sulfur dichloride in the presence of an organic solvent. The sulfur halide was added slowly in the form of a solution to a solution miscible therewith of the amine while retaining the temperature at 5–15° C. during the addition. The agitation was continued for a short time after the completion of the sulfur halide addition. Thereupon the amine hydrochloride salt was filtered off. Upon evaporation of the filtrate a sulfide was obtained which according to analysis was believed to be the monosulfide of beta-n-butylaminopropionitrile.

EXAMPLE 3

Substantially two molecular proportions of beta-ethyl-aminopropionitrile (B. P. 93.5°–96° C./30 mm.) dissolved in trichlorethylene was admixed with 0.5 molecular proportion of sulfur monochloride dissolved in trichlorethylene. The reaction was effected by gradually adding the sulfur chloride solution to the amine solution at 0–10° C. The reaction mixture at this point was neutralized with one molecular proportion of sodium hydroxide added as a 25% aqueous solution and the condensation with sulfur monochloride completed by the concurrent addition of 0.5 molecular proportion of sulfur monochloride and one molecular proportion of sodium hydroxide as a 25% aqueous solution. Since the product was only partially soluble in the solvent, the major portion was isolated by filtration, the remainder being obtained after removal of the solvent from the filtrate. N,N'-dithio-bis-beta-ethylamino-propionitrile was obtained as a crystalline solid, M. P. 77°–79° C. The total yield was 97.5%. It was very soluble in acetone, ethyl acetate, chloroform, benzene and hot alcohol. It was slightly soluble in ether and hot heptane but virtually insoluble in water. Sulfur calculated for $C_{10}H_{18}N_4S_2$ was 24.8%, found 24.0%. Nitrogen calculated was 21.7%, found 21.7%.

EXAMPLE 4

Substantially 89.6 parts by weight of beta-isopropylaminopropionitrile were dissolved in 584 parts by weight of trichlorethylene. To the solution so prepared a solution of 27 parts by weight of sulfur monochloride in 58 parts by weight of trichlorethylene were added over a period of about 45 minutes while stirring and keeping the temperature of the reaction mixture within the range of 0–8° C. 64 parts by weight of 25% aqueous caustic soda were then added and the mixture stirred about 5 minutes. The second half of the sulfur monochloride consisting of 27 parts by weight dissolved in 58 parts by weight of trichlorethylene was then added concurrently with another 64 parts by weight of 25% aqueous caustic soda, this addition requiring about 40 minutes. The organic layer was washed several times with water and the solvent removed by distillation and the residue stripped by heating at 95–110° C./5–10 mm. The yield of N,N'-dithio-bis-beta-isopropylaminopropionitrile, an amber oil, was 99.9% or essentially quantitative. Analysis for sulfur and nitrogen gave 22.8% and 19.5% respectively as compared with calculated values of 22.38% and 19.58%.

Replacement of trichlorethylene with benzene in the foregoing procedure gave essentially the same results.

EXAMPLE 5

Substantially one molecular proportion of n-butylaminoacetonitrile was dissolved in 584 parts by weight of trichlorethylene. While keeping the reaction mixture at 0–10° C., 0.25 molecular proportion of sulfur monochloride dissolved in 73 parts of trichlorethylene was gradually added. The by-product hydrochloride was then neutralized by the addition of 0.5 molecular proportion of sodium hydroxide in the form of a 25% aqueous solution. A second 0.25 mole of sulfur monochloride was added as before concurrently with another 0.5 molecular proportion of sodium hydroxide as a 25% aqueous solution. The organic layer was washed with water and the solvent removed by distillation, the residue being stripped under vacuum by heating at 95–110° C./5–10 mm. The product isolated in this manner, believed to be N,N'-dithio-bis-n-butylaminoacetonitrile, was a red oil obtained in 97.2% yield. It was very soluble in ether, acetone, alcohol, ethyl acetate, heptane, chloroform and benzene but insoluble in water. Sulfur calculated for $C_{12}H_{22}N_4S_2$ was 22.38%, found 23.2%. Nitrogen calculated was 19.58%, found 19.5%.

EXAMPLE 6

The initial charge consisted of 213 parts by weight of cyclohexylaminoacetonitrile dissolved in 1240 parts by weight of trichlorethylene. The first stage of the reaction was carried out by adding at 0–10° C., 50.6 parts by weight of sulfur monochloride dissolved in 109 parts by weight of trichlorethylene. 120 parts by weight of 25% aqueous caustic soda were then added. Finally another portion of sulfur monochloride identical with the first was added concurrently with 120 parts by weight of 25% aqueous caustic soda. After the reaction was completed water was added to dissolve the salt and the product layer washed with water. The solvent was then distilled off under reduced pressure. The semi-crystalline red syrup obtained in 99.8% yield was believed to be N,N'-dithio-bis-cyclohexylaminoacetonitrile. It was very soluble in ether, acetone, alcohol, ethyl acetate, chloroform and benzene and somewhat soluble in heptane although insoluble in water. Sulfur calculated for $C_{16}H_{26}N_4S_2$ was 18.93%, found 18.4%. Nitrogen calculated was 16.57%, found 16.6%.

EXAMPLE 7

Substantially 123 parts by weight (one molecular proportion) of beta, beta prime-iminodipropionitrile was dissolved in 440 parts by weight of benzene. To this solution was added at 0-10° C. a solution of 34 parts by weight (0.25 molecular proportion) of sulfur monochloride in 44 parts by weight of benzene. The by-product hydrochloride was then neutralized by addition of 80 parts by weight (substantially 0.5 molecular proportion) of 25% aqueous sodium hydroxide. The reaction was then completed by the concurrent addition of another 34 parts by weight of sulfur monochloride dissolved in benzene and 80 parts by weight of 25% aqueous sodium hydroxide. The separated solids were filtered, washed with water and dried. The product, believed to be N,N'-dithio-bis-beta, beta-prime-iminodipropionitrile, was obtained as colorless crystals, M. P. 69-74° C. The product was very soluble in acetone, hot alcohol, hot ethyl acetate and hot chloroform and slightly soluble in hot benzene but insoluble in ether, heptane and water. Sulfur calculated for $C_{12}H_{16}N_6S_2$ was 20.8%, found 20.9%. Nitrogen calculated was 27.26%, found 27.15%.

EXAMPLE 8

A condensation reaction was effected employing substantially one molecular proportion of 1,6-hexanediamine as a 72% aqueous solution and two molecular proportions of acrylonitrile. The condensation was effected in aqueous medium in the manner known for condensing amines with acrylonitrile. Salt was added to saturate the solution and salt out the upper product layer which was then separated and extracted with benzene. The benzene extracts were combined, dried, filtered and the solvent removed by evaporation and finally by stripping up to 97° C. under 12 mm. vacuum. A pale yellow-green syrup was obtained in a yield of 74.2%. The product contained 24.1% nitrogen by analysis as compared to 25.2% calculated for N,N'-bis-(2-cyanoethyl)-1,6-hexanediamine. Substantially 57 parts by weight (0.25 molecular proportion) of the crude N,N'-bis-(2-cyanoethyl)-1,6-hexanediamine so obtained was dissolved in 265 parts by weight of benzene. To this solution was added at 0-10° C. 17 parts by weight (0.125 molecular proportion) of sulfur monochloride dissolved in 22 parts by weight of benzene. The reaction mixture was then neutralized by the addition of 40 parts by weight of 25% aqueous caustic soda (0.25 molecular proportion). The reaction was then completed by the concurrent addition of another 17 parts by weight of sulfur monochloride and 40 parts by weight of 25% aqueous caustic soda. Separation of the layers was facilitated by the addition of 200 parts by weight of ethyl acetate and filtering through diatomaceous silica. The solvent layer was washed with water and the product isolated by distilling off the solvent under reduced pressure. The product was an amber syrup which set to a soft resin on cooling. Analysis gave 20.1% sulfur and 18.9% nitrogen as compared to 22.5% sulfur and 19.7% nitrogen calculated for N,N'-dithio-beta, beta-prime-(hexamethylenediimino) dipropionitrile. Thus the product may be represented by the structure

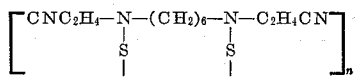

where $n$ is an integer. The product was very soluble in acetone, chloroform and benzene, slightly soluble in alcohol and ethyl acetate but essentially insoluble in ether, water and heptane.

EXAMPLE 9

Substantially 45.5 parts by weight (0.25 molecular proportion) of beta-tert. octylaminopropionitrile, B. P. 110-115° C./6 mm.,

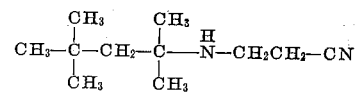

was dissolved in 292 parts by weight of trichlorethylene. To this solution at 0-10° C. was gradually added with stirring a solution of 8.5 parts by weight (0.0625 molecular proportion) of sulfur monochloride dissolved in 20 parts by weight of trichlorethylene. The reaction mixture was neutralized by the addition of 20 parts by weight of 25% aqueous caustic soda (0.125 molecular proportion). Another 8.5 parts by weight portion of sulfur monochloride was added as before but concurrently with 20 parts by weight of 25% aqueous caustic soda. The organic layer was separated and washed with water and the solvent removed by distillation. The residue comprising the desired product was a yellow syrup which partially crystallized after several days. The yield was 91%. This product, believed to be N,N'-dithio-bis-beta-tert. octylaminopropionitrile, was very soluble in ether, acetone, alcohol, ethyl acetate, heptane, chloroform and benzene but virtually insoluble in water. Sulfur calculated for $C_{22}H_{42}N_4S_2$ was 15.02%, found 14.5%. Nitrogen calculated was 13.14%, found 13.10%.

The new amine sulfides, particularly the disulfides and higher polysulfides, are excellent vulcanization agents for natural rubber and synthetic rubber. For example a natural rubber stock comprising:

| Stock A | Parts by weight |
|---|---|
| Smoked sheets rubber | 100 |
| Zinc oxide | 5 |
| Stearic acid | 1 |
| N-Cyclohexyl-2-benzothiazole sulfenamide | 1 |
| N,N'-dithio-bis-beta-ethylaminopropionitrile | 3.5 | was compounded and vulcanized in the usual manner by heating in a press for 45 minutes at 142° C. The vulcanizate so obtained possessed an ultimate tensile strength of 3040 pounds per square inch and an ultimate elongation of 720%. Thus the new amine sulfides are characterized by giving very fast cures of high strength.

As further exemplary of the activity of the new amine sulfides in natural rubber a stock similar to stock A was compounded employing instead of the N,N'-dithio-bis-beta-ethylaminopropionitrile vulcanizing agent, 3.8 parts by weight of a cyanoalkyl substituted amine sulfide believed to consist chiefly of N,N'-dithio-bis-beta-n-butylaminopropionitrile. The stock was compounded and vulcanized in the usual manner. The vulcanizate obtained in 30 minutes at about 142° C. possessed an ultimate tensile strength of 2713 pounds per square inch and an ultimate elongation of 716%.

As further exemplary of the utility of the new amine sulfides as vulcanization agents the following synthetic rubber stocks comprising:

| Stock | B | C | D |
|---|---|---|---|
| Rubber-like copolymer of butadiene-1,3 and styrene | 100 | 100 | 100 |
| Carbon black | 40 | 40 | 40 |
| Zinc oxide | 3 | 3 | 3 |
| Mineral hydrocarbon softener | 8 | 8 | 8 |
| N-Cyclohexyl 2-benzothiazole sulfenamide | 2 | 2 | 2 |
| Sulfur | 2 | | |
| N,N'-dithio-bis-beta-ethylaminopropionitrile | | 2 | |
| N,N'-dithio-bis-beta-n-butylaminopropionitrile | | | 2 | were compounded and vulcanized in the usual manner by heating in a press for 60 minutes at 142° C. The vulcanizates so obtained were then aged for 24 hours at 100° C. in an air circulating oven. The physical properties of the unaged and aged vulcanizates are set forth below:

*Table I*

| Stock | Modulus in lbs./in.² at Elongation of 300% | Ultimate Tensile in lbs./in.² | Ultimate Elongation, Percent |
|---|---|---|---|
| Unaged: | | | |
| B | 1,220 | 1,990 | 405 |
| C | 360 | 2,485 | 830 |
| D | 420 | 2,015 | 715 |
| Aged: | | | |
| B | | 1,280 | 225 |
| C | 550 | 2,675 | 745 |
| D | 573 | 2,573 | 713 |

The data show that the new amine sulfides provide vulcanizates which are highly resistant to the deteriorating effects of heat and oxidation even in the absence of an antioxidant whereas vulcanizates employing ordinary amounts of free sulfur as the vulcanization agent are much less resistant. Synthetic rubber stocks cured with N,N'-trithio-bis-cyclohexylaminoacetonitrile as the vulcanization agent were also characterized by good aging properties.

To demonstrate further the usefulness of the new amine sulfides as vulcanization agents the following stocks were compounded comprising:

| Stock | E | F | G | H |
|---|---|---|---|---|
| Smoked sheets rubber parts by weight | 100 | 100 | 100 | 100 |
| Furnace carbon black do | 50 | 50 | 50 | 50 |
| Zinc oxide do | 5 | 5 | 5 | 5 |
| Mineral hydrocarbon softener do | 3 | 3 | 3 | 3 |
| Stearic acid do | 2 | 2 | 2 | 2 |
| p-Amino biphenyl-acetone reaction product parts by weight | 1.5 | 1.5 | 1.5 | 1.5 |
| N-cyclohexyl-2-benzothiazole sulfenamide parts by weight | 0.8 | 0.8 | 0.8 | 0.8 |
| Sulfur do | 2 | | | |
| N,N'-dithio-bis-beta-cyclohexylaminopropionitrile parts by weight | | 1.0 | 2.0 | 3.5 |

Vulcanization was effected by heating in a press at 144° C. for various periods of time. The physical properties of the respective stocks at the respective curing times are set forth below:

*Table II*

| Stock | Minutes' Cure at 144° C. | Modulus in lbs./in.² at Elongation of 300% | Ultimate Tensile, lbs./in.² | Ultimate Elongation, Percent |
|---|---|---|---|---|
| E | 15 | 2,387 | 3,917 | 500 |
| F | 15 | 146 | 466 | 570 |
| G | 15 | 130 | 486 | 600 |
| H | 15 | 80 | 300 | 700 |
| E | 30 | 2,313 | 3,787 | 470 |
| F | 30 | 736 | 1,823 | 510 |
| G | 30 | 1,255 | 3,080 | 575 |
| H | 30 | 1,815 | 3,595 | 525 |
| E | 45 | 2,217 | 3,750 | 473 |
| F | 45 | 830 | 2,063 | 526 |
| G | 45 | 1,360 | 3,235 | 555 |
| H | 45 | 1,750 | 3,790 | 565 |

The data clearly show that the new amine sulfides are much less scorchy vulcanization agents than free sulfur. The scorch time as measured by the Mooney plastometer employing the large rotor at 135° C. was found to be 20 minutes or more for stocks F, G, and H, respectively, whereas the scorch time for stock E was about 4 minutes. Thus the cyanoalkyl substituted amine sulfides are particularly useful vulcanization agents in rubber stocks containing furnace carbon blacks.

Good cures have been obtained by combining rubber, carbon black and the thioamine. For example a stock comprising:

| | Parts by weight |
|---|---|
| Smoked sheets rubber | 100 |
| Furnace carbon black | 50 |
| N,N'-dithio-bis-beta-isopropylaminopropionitrile | 5 | cured in 30 minutes at 292° F. in open steam. The 300% modulus was 2240 pounds per square inch, the ultimate tensile 2800 pounds per square inch and the ultimate elongation 345%.

The curing properties of other examples of the new compounds are illustrated by the following stocks. A base stock was compounded comprising:

| | Parts by weight |
|---|---|
| Smoked sheets rubber | 100 |
| Furnace carbon black | 50 |
| Zinc oxide | 5 |
| Mineral hydrocarbon softener | 3 |
| Stearic acid | 2 |
| p-Amino biphenyl-acetone reaction product | 1.5 |
| N-Cyclohexyl 2-benzothiazole sulfenamide | 0.8 |

The thioamines were added to the base stock and the stocks cured in the usual manner by heating in a press at 292° F. The physical properties of the 45 minute cures are shown below to illustrate the characteristics of the vulcanizates.

*Table III*

| Material Added to Base Stock | Parts by Weight | Modulus in lbs./in.² at Elongation of 300% | Ultimate Tensile, lbs./in.² | Ultimate Elongation, Percent |
|---|---|---|---|---|
| N,N'-dithio-bis cyclohexylamino-acetonitrile | 5.4 | 1,000 | 2,970 | 640 |
| N,N'-dithio-bis-n-butylamino-acetonitrile | 4.5 | 870 | 2,906 | 636 |
| N,N'-dithio-bis-(beta, beta prime-iminodipropionitrile) | 4.8 | ¹ 1,656 | ¹ 3,416 | ¹ 543 |

¹ 60 minute cure.

As further exemplary of the exceptional non-scorching properties of the new amine sulfides in rubber a furnace black stock similar to the above was compounded ind vulcanized employing N,N'-dithio-bis-beta-n-butylaminopropionitrile as the vulcanization agent and compared to a like stock cured under the same conditions employing an equal weight of free sulfur as the vulcanizing agent. A mixture of 2,4-dinitro phenyl thio benzothiazole and diphenyl guanidine phthalate was employed as the vulcanization accelerator instead of N-cyclohexyl 2-benzothiazole sulfenamide. The scorch time as measured by the Mooney plastometer employing the large rotor at 135° C. was greater for the rubber stock cured with the new amine sulfide than that for the free sulfur cured rubber stock.

The new amine sulfides, particularly the di-, tri- and tetrasulfides of N-cycloaliphatic and N-aliphatic N-cyanoalkyl amines, in addition to being curing agents for the rubber-like copolymers of butadiene-1,3 and styrene are strong vulcanization agents for the rubber-like copolymers of butadiene-1,3 and acrylonitrile and other butadiene-vinyl compound sulfur vulcanizable copolymers. The tetrasulfide of n-butylaminoacetonitrile was employed as the vulcanization agent in the curing of rubber-like copolymers of butadiene-1,3 and acrylonitrile and gave excellent modulus and tensile properties to the vulcanizates. In addition the stocks were highly resistant to swelling by organic solvents.

Other vulcanization accelerators, particularly the organic sulfur-containing accelerators of the thiazole type, effective with sulfur vulcanization have been found useful in accelerating the rate of cure of natural and synthetic rubber stocks employing the new amine sulfides as vulcanization agents. The new amine sulfides in pure or crude form employed as vulcanization agents in amounts of 1 to 7 parts on the rubber have given satisfactory vulcanizates, however, depending upon the particular amine sulfide, the compounding ingredients, particularly the vulcanization accelerator, and the designs of the compounder, larger or smaller amounts may be employed.

Other examples of the new compounds which exhibit properties characteristic of the new family of chemicals are the sulfides of the following amines: beta-methylaminopropionitrile, beta-ethylaminoisobutyronitrile, beta-ethylaminobutyronitrile, beta - n - propylaminopropionitrile, beta-isopropylaminobutyronitrile, beta-tert. butylaminopropionitrile, beta-n-butylaminoisobutyronitrile, beta-n-amylaminopropionitrile, beta-hexylaminopropionitrile, beta-octylaminopropionitrile, beta-n-nonylaminopropionitrile, beta-decylaminopropionitrile, beta-dodecylaminopropionitrile, beta - pentadecylaminopropionitrile, amylaminoacetonitrile, alpha - n - propylaminovaleronitrile, beta - benzylaminobutyronitrile, beta - chlorbenzylaminopropiontrile, beta(beta-phenethylamino) propionitrile, beta-cyclohexylaminobutyronitrile and the equivalent analogues and homologues thereof.

The monosulfides, the disulfides and the higher sulfides of the cyanoalkyl substituted amines are useful as insecticides and fungicides also.

While many specific embodiments of the invention have been described, it will be apparent to those skilled in the art that many variations can be made without departing from the spirit or scope of the invention. For example, in making the higher polysulfides sulfur halides instead of free sulfur have been successfully employed as reactants with the amine disulfides.

This application is a continuation-in-part of co-pending applications Serial No. 130,078, filed November 29, 1949, now abandoned; Serial No. 187,697, filed September 29, 1950; and Serial No. 213,291, filed February 28, 1951, now abandoned. The properties of the new compounds in rubber compounding are also described and claimed in co-pending application Serial No. 187,701, filed September 29, 1950.

What is claimed is:

1. As a new composition of matter a compound of the structure

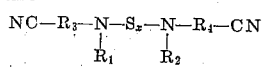

where $R_3$ and $R_4$ are alkylene radicals containing less than five carbon atoms and $R_1$ and $R_2$ are organic radicals containing less than sixteen carbon atoms selected from the group consisting of hydrocarbon radicals mono chloro alkyl radicals, mono cyano alkyl radicals, mono alkoxy alkyl radicals and mono amino alkyl radicals and $x$ is an integer at least one but less than five.

2. As a new composition of matter a compound of the structure

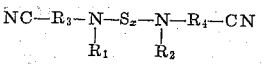

where $R_3$ and $R_4$ are alkylene radicals containing less than five carbon atoms, where $R_1$ and $R_2$ are hydrocarbon radicals containing less than sixteen carbon atoms and where $x$ is an integer at least one but less than five.

3. As a new composition of matter a compound of the structure

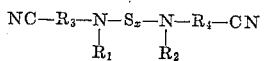

where $R_3$ and $R_4$ are alkylene radicals containing less than five carbon atoms, where $R_1$ and $R_2$ are aliphatic hydrocarbon radicals containing less than sixteen carbon atoms, and where $x$ is an integer at least one but less than five.

4. As a new composition of matter a compound of the structure

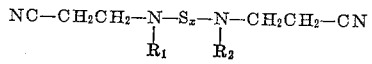

where $R_1$ and $R_2$ are aliphatic hydrocarbon radicals containing less than sixteen carbon atoms and where $x$ is an integer not less than two nor more than four.

5. A compound of the structure

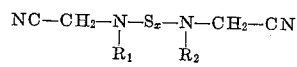

where $R_1$ and $R_2$ represent aliphatic hydrocarbon radicals containing less than sixteen carbon atoms and $x$ is an integer at least one but less than five.

6. As a new composition of matter an N,N'-thio - bis - isopropylaminoacetonitrile containing less than five atoms of sulfur.

7. As a new composition of matter a compound of the structure

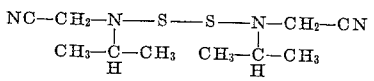

8. As a new composition of matter a compound of the structure

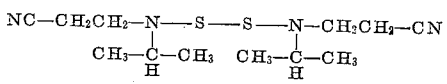

9. As a new composition of matter a compound of the structure

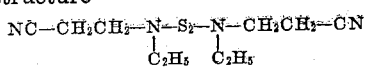

10. As a new composition of matter a compound of the structure

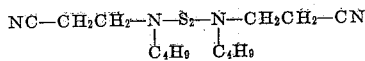

11. As a new composition of matter a compound of the structure

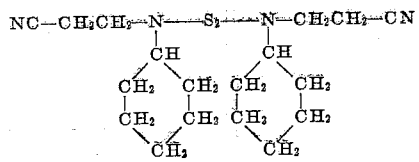

12. The method of making N,N'-thio-bis-nitriles which comprises reacting a sulfur halide with an amino alkyl cyanide of the structure

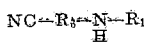

where $R_3$ is an alkylene radical containing less than five carbon atoms and where $R_1$ is an aliphatic radical containing less than sixteen carbon atoms selected from the group consisting of hydrocarbon radicals, mono chloro alkyl radicals, mono cyano alkyl radicals, mono alkoxy alkyl radicals and mono amino alkyl radicals.

13. The method of making N,N'-thio-bis-nitriles which comprises reacting a sulfur halide with an amino alkyl cyanide of the structure

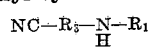

where $R_3$ is an alkylene radical containing less than five carbon atoms and where $R_1$ is an aliphatic hydrocarbon radical containing less than sixteen carbon atoms.

14. The method of making N,N'-thio-bis-nitriles which comprises reacting substantially two molecular proportions of beta-ethylaminopropionitrile with substantially one molecular proportion of sulfur monochloride.

15. The method of making N,N'-thio-bis-nitriles which comprises reacting substantially two molecular proportions of beta-n-butylaminopropionitrile with substantially one molecular proportion of sulfur monochloride.

16. The method of making N,N'-thio-bis-nitriles which comprises reacting substantially two molecular proportions of beta-cyclohexylaminopropionitrile with substantially one molecular proportion of sulfur monochloride.

17. The method of making N,N'-thio-bis-nitriles which comprises reacting substantially two molecular proportions of beta-isopropylaminopropionitrile with substantially one molecular proportion of sulfur monochloride.

MARION W. HARMAN.

No references cited.